United States Patent
Hollomon et al.

(10) Patent No.: US 7,396,874 B2
(45) Date of Patent: Jul. 8, 2008

(54) CATIONIC OR AMPHOTERIC COPOLYMERS PREPARED IN AN INVERSE EMULSION MATRIX AND THEIR USE IN PREPARING CELLULOSIC FIBER COMPOSITIONS

(75) Inventors: Martha Hollomon, Newark, DE (US);
Brian L. Walchuk, Hockessin, DE (US);
Frank J. Sutman, Jacksonville, FL (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/728,145

(22) Filed: Dec. 4, 2003

(65) Prior Publication Data

US 2004/0143039 A1 Jul. 22, 2004

Related U.S. Application Data

(60) Provisional application No. 60/431,652, filed on Dec. 6, 2002.

(51) Int. Cl.
*C08F 2/32* (2006.01)
*C08F 220/56* (2006.01)
*C08F 222/00* (2006.01)
*C08F 220/06* (2006.01)
*C08F 293/00* (2006.01)

(52) U.S. Cl. .................. 524/815; 526/310; 526/916
(58) Field of Classification Search .............. 524/815; 526/310, 916
See application file for complete search history.

(56) References Cited

U.S. PATENT DOCUMENTS

| | | | |
|---|---|---|---|
| 3,284,393 A | 11/1966 | Vanderhoff et al. ........ 260/29.6 | |
| 3,836,537 A | 9/1974 | Boerwinkle et al. | |
| RE28,474 E | 7/1975 | Anderson et al. .......... 260/29.6 | |
| RE28,576 E | 10/1975 | Anderson et al. .......... 260/29.6 | |
| 3,974,116 A * | 8/1976 | Lissant ........................ 524/436 | |
| 4,147,688 A | 4/1979 | Makhlouf et al. | |
| 4,172,066 A | 10/1979 | Zweigle et al. | |
| 4,203,877 A | 5/1980 | Baker | |
| 4,294,885 A | 10/1981 | Sunden ........................ 428/404 | |
| 4,339,371 A * | 7/1982 | Robinson et al. ............ 524/310 | |
| 4,388,150 A | 6/1983 | Sunden et al. ............... 162/175 | |
| 4,426,485 A | 1/1984 | Hoy et al. | |
| 4,505,828 A | 3/1985 | Lipowski et al. | |
| 4,528,321 A | 7/1985 | Allen et al. | |
| 4,552,670 A | 11/1985 | Lipowski et al. | |
| 4,599,390 A | 7/1986 | Fan et al. | |
| 4,659,431 A | 4/1987 | Probst et al. | |
| 4,673,704 A | 6/1987 | Flesher et al. | |
| 4,681,912 A | 7/1987 | Durand et al. | |
| 4,702,844 A | 10/1987 | Flesher et al. | |
| 4,720,346 A | 1/1988 | Flesher et al. | |
| 4,753,710 A | 6/1988 | Langley et al. ........... 162/164.3 | |
| 4,759,856 A | 7/1988 | Farrar et al. | |
| 4,875,055 A | 10/1989 | McCann et al. | |
| 4,918,123 A | 4/1990 | Yang et al. ................... 524/110 | |
| 4,921,903 A | 5/1990 | Fong | |
| 5,098,520 A | 3/1992 | Begala | |
| 5,104,552 A | 4/1992 | Cicchiello | |
| 5,132,023 A | 7/1992 | Kozakiewicz et al. | |
| 5,167,766 A * | 12/1992 | Honig et al. ............. 162/164.1 | |
| 5,171,808 A | 12/1992 | Ryles et al. | |
| 5,180,473 A | 1/1993 | Akune et al. | |
| 5,200,448 A | 4/1993 | Robinson et al. | |
| 5,208,216 A | 5/1993 | Williamson et al. | |
| 5,274,055 A | 12/1993 | Honig et al. .................... 524/47 | |
| 5,298,555 A | 3/1994 | O'Connor et al. | |
| 5,376,713 A * | 12/1994 | O'Connor et al. ........... 524/728 | |
| 5,468,797 A | 11/1995 | Adams et al. | |
| 5,518,634 A | 5/1996 | Pillai et al. | |
| 5,653,886 A | 8/1997 | Kerr et al. .................... 210/727 | |
| 5,679,740 A | 10/1997 | Heitner | |
| 5,739,190 A | 4/1998 | Hartmann et al. | |
| 5,750,614 A | 5/1998 | Hund et al. | |
| 5,763,530 A * | 6/1998 | Chen et al. ................... 524/521 | |
| 5,788,867 A | 8/1998 | Pearson | |
| 5,837,215 A | 11/1998 | Tippett et al. | |
| 5,883,181 A | 3/1999 | Cicchiello et al. | |
| 5,939,485 A | 8/1999 | Bromberg et al. | |
| 5,958,188 A | 9/1999 | Heard et al. | |

(Continued)

FOREIGN PATENT DOCUMENTS

EP 0 202 780 11/1986

(Continued)

OTHER PUBLICATIONS

Hypermer® Polymeric Surfactants: Emulsifiers for Inverse Emulsion Polymerization Processes, from ICI Surfactants a business unit of ICI Americas Inc., 1997 (Technical sales literature).
Public version of Expert Report of Robert K. Prud'homme dated Sep. 7, 2005 (unredacted version dated Jul. 22, 2005).
Public version of Expert Report of James N. Greenshields dated Sep. 7, 2005 (unredacted version dated Aug. 19, 2005).
Exhibit H to public version of Expert Report of James N. Greenshields: Hernandez-Barajas et al., Polymers for Advanced Technologies, 6:509-517 (1995).
Exhibit I to public version of Expert Report of James N. Greenshields: Hernandez-Barajas et al., Polymer, 38(2):437-447 (1997).
Public version of Expert Report of Charles P. Klass dated Jul. 22, 2005.
Exhibit D to public version of Expert Report of Charles P. Klass. Avery, Tappi 62(2):43-46 (1979).

(Continued)

*Primary Examiner*—Kelechi C. Egwim
(74) *Attorney, Agent, or Firm*—Joanne Mary Fobare Rossi; Gary A. Samuels

(57) ABSTRACT

A papermaking method and a composition which utilize, as a drainage aid, a water-soluble cationic or amphoteric copolymer prepared via a water-in-oil polymerization technique that, absent a cross-linking agent, is characterized by a Huggins' constant (k') determined in 0.01M NaCl greater than 0.3 and a storage modulus (G') at 6.3 Hz greater than 50 Pa.

14 Claims, No Drawings

U.S. PATENT DOCUMENTS

| | | | |
|---|---|---|---|
| 5,985,992 A | 11/1999 | Chen | |
| 6,020,422 A | 2/2000 | Connors | |
| 6,040,376 A | 3/2000 | Mallon et al. | |
| 6,107,398 A * | 8/2000 | Mallo et al. | 524/832 |
| 6,124,396 A | 9/2000 | Hahn et al. | 524/801 |
| 6,210,585 B1 | 4/2001 | Tippett et al. | |
| 6,217,778 B1 | 4/2001 | Shing et al. | |
| 6,221,956 B1 | 4/2001 | Chen | |
| 6,310,157 B1 | 10/2001 | Heard et al. | |
| 6,313,199 B1 | 11/2001 | Davies et al. | |
| 6,331,229 B1 | 12/2001 | Wong Shing et al. | |
| 6,359,031 B1 | 3/2002 | Lykke et al. | |
| 6,444,091 B1 | 9/2002 | Ward et al. | |
| 2002/0103331 A1* | 8/2002 | Zeh et al. | 528/422 |
| 2002/0176836 A9 | 11/2002 | Belli et al. | |
| 2002/0190005 A1 | 12/2002 | Branning | |
| 2004/0102528 A1 | 5/2004 | Walchuk et al. | |

FOREIGN PATENT DOCUMENTS

| | | |
|---|---|---|
| EP | 0 277 728 | 1/1988 |
| EP | 277728 A * | 8/1988 |
| EP | 0 584 771 A1 | 3/1994 |
| SU | 2 040 528 | 12/1988 |
| WO | 03/050152 | 6/2003 |
| WO | 03/050152 A1 | 6/2003 |

OTHER PUBLICATIONS

Public version of Rebuttal Expert Report of Charles P. Klass dated Sep. 7, 2005 (unredacted version dated Aug. 19, 2005).

Exhibit D to public version of Rebuttal Expert Report of Charles P. Klass: Dictionary of Paper, 5th Edition, 181, 195 (Michael Kouris ed., Tappi Press 1996).

Exhibit E to public version of Rebuttal Expert Report of Charles P. Klass: Retention of Fines and Fillers During Papermaking 80-97 and 175 (Jerome M. Gess ed., Tappi Press 1998).

Public version of Rebuttal Expert Report of Robert K. Prud'homme dated Sep. 7, 2005 (unredacted version dated Aug. 19, 2005).

Exhibit 5 to Rebuttal Expert Report of Robert K. Prud'homme: Cabane et al., Nature 314:385 (1985).

Exhibit 6 to Rebuttal Expert Report of Robert K. Prud'homme: Grieser et al., J. Phys. Chem. 92(20):5580-5593 (1988).

Exhibit 17 to Rebuttal Expert Report of Robert K. Prud'homme: Pure and Applied Chemistry 40(3):479-491 (1974).

Exhibit 18 to Rebuttal Expert Report of Robert K. Prud'homme: Pure and Applied Chemistry 68(12):2287-2311 (1996).

Exhibit 20 to Rebuttal Expert Report of Robert K. Prud'homme: Polymer Handbook 23-24 (J Brandup & E.H. Immergut eds., Wiley Interscience 1995).

Exhibit 24 to Rebuttal Expert Report of Robert K. Prud'homme: Jain et al., Macromolecules 37:1511-1523 (2004).

Exhibit 28 to Rebuttal Expert Report of Robert K. Prud'homme: Panmai et al., Langmuir 18:3860-3864 (2002).

Public version of Supplemental Expert Report of James N. Greenshields dated Sep. 26, 2005.

Public version of Supplemental Expert Report of Charles P. Klass dated Sep. 26, 2005.

Public version of Supplemental Expert Report of Robert K. Prud'homme dated Sep. 26, 2005.

Public version of Expert Report of Professor Norman J. Wagner, Ph.D., dated Jul. 22, 2005.

Public version of Expert Report of Professor Robert G. Gilbert, Ph.D., dated Jul. 22, 2005.

Hunkeler, Polymer 22:5623-41 (1997).

Lamb et al., Biomacromolecules 2:518-525 (2001).

Subramaniam et al., Macromol. Symp. 152:43-53 (2000).

Santangelo et al., J. Non-Crystalline Solids 235:709-716 (1988).

Moad et al., Macromolecules 29:7717-7726 (1996).

Seabrook et al., J. Polym. Sci. Part A Polym. Chem. 43:1357-1368 (2005).

Lacik et al., Macromol. Chem. Phys. 205:1080-1087 (2004).

Gavat et al., J. Polym. Sci. Polymer Symp. 64:125-140 (1978).

Matsuoka et al., Polymer 43:3447-3453 (2002).

Rotureau et al., Macromolecules 38:4940-4941 (2005).

International Union of Pure and Applied Chemistry Macromolecular Division, Commission on Macromolecular Nomenclature, Glossary of Basic Terms in Polymer Science (IUPAC Recommendations 1996).

Public version of Rebuttal Expert Report of Clarence A. King, Ph.D., dated Aug. 19, 2005.

Public version of Rebuttal Expert Report of Robert G. Gilbert, Ph.D., dated Aug. 18, 2005.

Public version of Supplemental Report of Norman J. Wagner, Ph.D., dated Oct. 14, 2005.

Exhibit D to public version of Supplemental Report of Norman J. Wagner: Ma et al., Macromolecules 35:2024-2029 (2002).

Exhibit F to public version of Supplemental Report of Norman J. Wagner: Barnes, J. Rheology 33(2):329-366 (1989).

Public version of Supplemental Report of Clarence A. King, Ph.D., dated Oct. 14, 2005.

Public version of Supplemental Report of Professor Robert G. Gilbert, dated Oct. 14, 2005.

Exhibit Q to public version of Supplemental Expert Report of Robert G. Gilbert, Ph.D.; portion of prosecution history of U.S. Appl. No. 07/886,209, which issued as U.S. Patent No. 5,274,055.

* cited by examiner

CATIONIC OR AMPHOTERIC COPOLYMERS PREPARED IN AN INVERSE EMULSION MATRIX AND THEIR USE IN PREPARING CELLULOSIC FIBER COMPOSITIONS

CROSS REFERENCE TO RELATED APPLICATIONS

This application is related to U.S. Provisional Patent Application Ser. No. 60/431,652, filed Dec. 6, 2002, from which priority is claimed, the foregoing application is herein incorporated by reference.

FIELD OF THE INVENTION

The present invention relates to water-soluble cationic and amphoteric copolymers obtained by inverse emulsion polymerization and their use in the preparation of cellulosic fiber compositions. The present invention further relates to cellulosic fiber compositions, such as paper and paperboard, which incorporate the water-soluble cationic and amphoteric copolymers.

BACKGROUND OF THE INVENTION

The making of cellulosic fiber sheets, particularly paper and paperboard, includes the following: 1) producing an aqueous slurry of cellulosic fiber; which may also contain inorganic mineral extenders or pigments; 2) depositing this slurry on a moving papermaking wire or fabric; and 3) forming a sheet from the solid components of the slurry by draining the water.

The foregoing is followed by pressing and drying the sheet to further remove water. Organic and inorganic chemicals are often added to the slurry prior to the sheet-forming step to make the papermaking method less costly, more rapid, and/or to attain specific properties in the final paper product.

The paper industry continuously strives to improve paper quality, increase productivity, and reduce manufacturing costs. Chemicals are often added to the fibrous slurry before it reaches the papermaking wire or fabric, to improve the paper machine drainage/dewatering and solids retention; these chemicals are called retention and/or drainage aids.

As to drainage/dewatering improvement, drainage or dewatering of the fibrous slurry on the papermaking wire or fabric is often the limiting step in achieving faster paper machine speeds. Improved dewatering can also result in a drier sheet in the press and dryer sections, resulting in reduced energy consumption. In addition, this is the stage in the papermaking method that determines many sheet final properties.

With respect to solids retention, papermaking retention aids are used to increase the retention of fine furnish solids in the web during the turbulent method of draining and forming the paper web. Without adequate retention of the fine solids, they are either lost to the mill effluent or accumulate to high levels in the recirculating white water loop, potentially causing deposit buildup. Additionally, insufficient retention increases the papermakers' cost due to loss of additives intended to be adsorbed on the fiber to provide the respective paper opacity, strength, or sizing properties.

High molecular weight (MW) water-soluble polymers with either cationic or amphoteric charge have traditionally been used as retention and drainage aids. Recent development of inorganic microparticles, known as microparticulate retention and drainage aids, in combination with high MW water-soluble polymers, have shown superior retention and drainage efficacy compared to conventional high MW water-soluble polymers. U.S. Pat. Nos. 4,294,885 and 4,388,150 teach the use of starch polymers with colloidal silica. U.S. Pat. No. 4,753,710 teaches flocculating the pulp furnish with a high MW cationic flocculant, inducing shear to the flocculated furnish, and then introducing bentonite clay to the furnish. U.S. Pat. Nos. 5,274,055 and 5,167,766 disclose using chemically cross-linked organic micropolymers as retention and drainage aids in the papermaking process.

Copolymers are also used to control deposition of contaminants or organic deposits in papermaking systems. Organic deposits is a term used to described tacky, water insoluble materials in the papermaking system that are detrimental to the production of paper. Such materials derived from trees during the pulping and papermaking process are termed pitch or wood pitch, while the term stickies is used to describe contaminants that are derived from adhesives or coatings introduced into the papermaking process as a contaminant of recycled fiber. One strategy for eliminating these materials is to agglomerate the organic deposits into larger, non-tacky particles that can be removed from the papermaking stock or incorporated into the sheet without causing deposits in the papermaking system of defects in the sheet. Chemicals that are able to interact with organic deposits and mitigate their negative impact include surfactants and polymers. The polymers can be ionic or nonionic, and includes materials used as flocculants, coagulants and dispersants.

The efficacy of the polymers or copolymers used will vary depending upon the type of monomers from which they are composed, the arrangement of the monomers in the polymer matrix, the molecular weight of the synthesized molecule, and the method of preparation. It is the latter characteristic that is a focus of the present invention.

Specifically, it has been unexpectedly discovered that water-soluble cationic and amphoteric copolymers when prepared under certain conditions exhibit unique physical characteristics. Additionally, said copolymers provide unanticipated activity in certain applications including papermaking applications such as retention and drainage aids and contaminant control aids. Although the synthesis methods employed are generally known to those skilled in the art, there is no prior art suggesting that the unique physical characteristics and unanticipated activity observed would result.

SUMMARY OF THE INVENTION

The present invention is directed to water soluble cationic and amphoteric copolymers and cellulosic fiber compositions containing the copolymer, particularly a cellulosic sheet such as paper or paperboard. The invention is also directed to a method for making the copolymer and the cellulosic fiber compositions.

In another aspect, the present invention provides a method of making a cellulosic fiber composition comprising adding, to a cellulose pulp slurry, a water-soluble cationic or amphoteric copolymer of Formula I or Formula II below. The invention further relates to cellulosic fiber compositions, including an aqueous slurry of cellulosic pulp, containing such water-soluble cationic or amphoteric copolymers. As used herein, the term copolymer is understood to be polymer compositions consisting of two or more different monomeric units.

In accordance with the present invention, it has been unexpectedly discovered that certain cationic and amphoteric copolymers exhibit unique physical characteristics and provide unanticipated activity when prepared employing certain polymerization conditions. The cationic and amphoteric copolymers of the invention are obtained from inverse (water-in-oil) emulsion polymerization. For cationic copolymers one or more water-soluble monomers, in particular one or more cationic monomers are used in the emulsion polymerization. For amphoteric copolymers one or more cationic monomers and one or more anionic monomers are used in the emulsion polymerization. The resulting cationic and amphoteric copolymers are water-soluble.

The cationic copolymers of the invention have the formula:

  (Formula I)

wherein B is a nonionic polymer segment formed from the polymerization of one or more nonionic monomers; C is an cationic polymer segment formed from polymerization of one or more ethylenically unsaturated cationic monomers; the molar % ratio B:C is from 1:99 to 99:1; and "co" is a designation for a polymer system with an unspecified arrangement of two or more monomer components. Furthermore, the preparation is conducted in a fashion, absent cross-linking agents and via a water-in-oil emulsion procedure, such that the Huggins' constant (k') determined in 0.01M NaCl is greater than 0.5 and the storage modulus (G') for a 3.0 wt. % actives polymer solution at 6.3 Hz is greater than 50 Pa.

The amphoteric copolymers of the invention have the formula:

  (Formula II)

wherein B is a nonionic polymer segment formed from the polymerization of one or more nonionic monomers; C is an cationic polymer segment formed from polymerization of one or more ethylenically unsaturated cationic monomers; A is an anionic polymer segment formed from polymerization of one or more ethylenically unsaturated anionic monomers; the minimum molar % of any of B, C, or A used to from the polymer is 1% and the maximum molar % of any of A, B and C is 98%; and "co" is a designation for a polymer system with an unspecified arrangement of two or more monomer components. Furthermore, the preparation is conducted in a fashion, absent cross-linking agents and via a water-in-oil emulsion procedure, such that the Huggins' constant (k') determined in 0.01 M NaCl is greater than 0.5 and the storage modulus (G') for a 1.5 wt. % actives polymer solution at 6.3 Hz is greater than 50 Pa.

DETAILED DESCRIPTION OF THE INVENTION

The present invention provides for water-soluble cationic and amphoteric copolymers with unique physical characteristics, methods of making the copolymers, and methods of making cellulose fiber compositions that comprise adding the water-soluble cationic and amphoteric copolymer to a cellulose pulp slurry. The general structure of the water-soluble cationic copolymer of the present invention is provided in Formula I. The general structure of the amphoteric copolymers of the invention is provide in Formula II.

  (Formula I)

  (Formula II)

The nonionic polymer segment B in Formula I and Formula II is the repeat unit formed after polymerization of one or more nonionic monomers. Exemplary monomers encompassed by B include, but are not limited to, acrylamide; methacrylamide; N-alkylacrylamides, such as N-methylacrylamide; N,N-dialkylacrylamide, such as N,N-dimethylacrylamide; methyl methacrylate; methyl acrylate; acrylonitrile; N-vinyl methylacetamide; N-vinylformamide; N-vinylmethyl formamide; ; vinyl acetate; N-vinyl pyrrolidone, mixtures of any of the foregoing and the like. The invention contempts that other types of nonionic monomer can be used.

The cationic polymer segment C in Formula I and Formula II is the repeat unit formed after polymerization of one or more cationic monomers. Exemplary monomers encompassed by C include, but are not limited to, cationic ethylenically unsaturated monomers such as the diallyldialkylammonium halides, such as diallyldimethylammonium chloride; the (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth)acrylamides, such as N,N-dimethylaminoethylacrylamide, and the salt and quaternaries thereof and mixture of the foregoing and the like.

The anionic polymer segment A in Formula II is the repeat unit formed after polymerization of one or more anionic monomers. Exemplary monomers encompassed by A include, but are not limited to, the free acids and salts of acrylic acid; methacrylic acid; maleic acid; itaconic acid; acrylamidoglycolic acid; 2-acrylamido-2-methyl-1-propanesulfonic acid; 3-allyloxy-2-hydroxy-1-propanesulfonic acid; styrenesulfonic acid; vinylsulfonic acid; vinylphosphonic acid; 2-acrylamido-2-methylpropane phosphonic acid; mixtures of any of the foregoing and the like.

The molar percentage of B:C of nonionic monomer to cationic monomer of Formula I may fall within the range of about 99:1 to 1:99, or about 99:1 to about 50:50 or about 95:5 to about 50:50, or about 95:5 to about 75:25, or 90:10 to 60:40, preferably the range is from about 95:5 to about 60:40 and even more preferably the range is from about 90:10 to about 70:30. In this regard, the molar percentages of B and C must add up to 100%. It is to be understood that more than one kind of nonionic monomer may be present in Formula I. It is also to be understood that more than one kind of cationic monomer may be present in Formula I.

With respect to the molar percentages of the amphoteric polymers of Formula II, the minimum amount of each of A, B and C is about 1% of the total amount of monomer used to form the polymer. The maximum amount of A, B or C is about 98% of the total amount of monomer used to form the polymer. Preferably the minimum amount of A is about 5%, more preferably the minimum amount of A is about 7% and even more preferably the minimum amount of each of A is about 10% of the total amount of monomer used to form the polymer. Preferably the minimum amount of each of B is about 5%, more preferably the minimum amount of B is about 7% and even more preferably the minimum amount of B is about 10% of the total amount of monomer used to form the polymer. Preferably the minimum amount of each of C is about 5%, more preferably the minimum amount of C is about 7% and even more preferably the minimum amount of C is about 10% of the total amount of monomer used to form the polymer. Preferably the amount of C (the cationic polymer segment) in the final polymer is not more than about 50% of the total, even more preferably not more than about 40% of the total. Preferably the amount of A (anionic polymer segment) in the final polymer is not more than about 80, more preferably not more than about 70% and even more preferably not more than about 60%. In this regard, the molar percentages of A, B and C must add up to 100%. It is to be understood that more than one kind of nonionic monomer may be present in Formula II, more than one kind of cationic monomer may be present in Formula II, and that more than one kind of anionic monomer may be present in Formula II.

In one preferred embodiment of the invention the water-soluble cationic or amphoteric copolymer is defined where B, the nonionic polymer segment, is the repeat unit formed after polymerization of acrylamide.

In another preferred embodiment of the invention the water-soluble amphoteric copolymer is defined where B, the nonionic polymer segment, is the repeat unit formed after polymerization of acrylamide and A is a salt of acrylic acid.

When a salt form of an acid is used to make an amphoteric polymer it is preferred that the cation of the salt is selected from $Na^+$, $K^+$ or $NH_4^+$.

It is also an aspect of this invention that the water-soluble cationic and amphoteric copolymers are prepared in such a fashion that the resulting polymers exhibit unique physical characteristics and provide unanticipated activity. The resulting water-soluble cationic and amphoteric copolymer is not considered to be a cross-linked polymer in that no cross-linking agent is utilized in the preparation. It is thought that small amounts of cross linking agent should not significantly affect the polymer properties of the present invention. The physical characteristics of the water-soluble cationic and amphoteric copolymers are unique in that their Huggins' constant (k') as determined in 0.01 M NaCl is greater than 0.5 and the storage modulus (G') for a 1.5 wt. % actives amphoteric polymer solution or 3.0 wt % actives for a cationic polymer solution, at 6.3 Hz is greater than 50 Pa, preferably greater than 75 and even more preferably greater than 100, or greater than 175, or greater than 200, or greater than 250. The Huggins' constant is greater than 0.5, preferably greater than 0.6, or greater than 6.5, or greater than 0.75, or greater than 0.9, or greater than 1.0.

Preferably the water-soluble cationic and amphoteric copolymers of the present invention are prepared by an inverse (water-in-oil) emulsion polymerization technique. Such processes are known to those skilled in the art, for example see U.S. Pat. No. 3,284,393, and Reissue U.S. Pat. Nos. 28,474 and 28,576, herein incorporated by reference. Preparation of an aqueous solution from the emulsion polymer may be effected by inversion by adding the emulsion polymer to water, wherein the emulsion or water may also contain a breaker surfactant. Breaker surfactants are additional surfactants that are added to an emulsion to promote inversion. The resulting copolymers may also be further isolated by precipitating in an organic solvent such as acetone and dried to a powder form or spray drying to a powder form. The powder can be easily dissolved in an aqueous medium for use in desired applications.

In general, an inverse emulsion polymerization process is conducted by 1) preparing an aqueous solution of the monomers, 2) adding the aqueous solution to a hydrocarbon liquid containing appropriate surfactant or surfactant mixture to form an inverse monomer emulsion, 3) subjecting the monomer emulsion to free radical polymerization, and 4) optionally adding a breaker surfactant to enhance the inversion of the emulsion when added to water.

Polymerization of the emulsion may be carried out in any manner known to those skilled in the art. Initiation may be effected with a variety of thermal and redox free-radical initiators including azo compounds such as azobisisobutyronitrile and the like. Polymerization may also be effected by photochemical irradiation processes, irradiation or by ionizing radiation with a $^{60}Co$ source.

Preferred initiators are oil soluble thermal initiators. Typical examples include, but are not limited to, 2,2'-azobis-(2,4-dimethylpentanonitrile); 2,2'-azobisisobutyronitrile (AIBN); 2,2'-azobis-(2,-methylbutanonitrile); 1,1'-azobis-(cyclohexanecarbonitrile); benzoylperoxide, lauryl peroxide and the like.

Any of the chain transfer agents known to those skilled in the art may be used to control the molecular weight. Those include, but are not limited to, lower alkyl alcohols such as isopropanol, amines, mercaptans such as mercaptoethanol, phosphites, thioacids, allyl alcohol, and the like.

The aqueous solution typically comprises an aqueous mixture of nonionic monomer or mixtures of nonionic monomers, and a cationic monomer or mixtures of cationic monomers. For the amphoteric copolymer, the aqueous solution typically comprises an aqueous mixture of nonionic monomer or mixtures of nonionic monomers, a cationic monomer or mixtures of cationic monomer and an anionic monomer or mixtures of anionic monomers. The aqueous phase may also comprise such conventional additives as are desired. For example, the mixture may contain chelating agents, pH adjusters, initiators, chain transfer agents as described above, and other conventional additives. For the preparation of the water-soluble cationic and amphoteric copolymer materials the pH of the aqueous solution is from about 2 to about 12 and is preferably equal to or greater than 2 and less than 10, more preferably the pH is greater than 2 and less than 8 and even more preferably, the pH is from about 3 to 7 and most preferably the pH is about 4 to about 6.

The hydrocarbon liquid typically comprises straight-chain hydrocarbons, branched-chain hydrocarbons, saturated cyclic hydrocarbons, aromatic hydrocarbons, or mixtures thereof.

The surfactants or surfactant mixtures used in the invention are generally oil soluble. One or more surfactants can be used. The surfactant or surfactant mixture chosen for the invention includes at least one diblock or triblock surfactant. The choice and amount of the surfactant or surfactant mixtures are selected in order to yield an inverse monomer emulsion for polymerization. Surfactants used in emulsion polymerization systems are known to those skilled in the art, for example see "Hypermer Polymeric Surfactants: Emulsifiers for Inverse Polymerization Processes", ICI Surfactants product literature, ICI Americas Inc., 1997. Exemplary surfactants include, but are not limited to, sorbitan monooleate (e.g., Atlas® G-946, Uniqema, New Castle, Del.), sorbitan sequioleate, sorbitan trioleate, polyoxyethylene sorbitan monooleate, di-2-ethylhexylsulfosuccinate, oleamido-propyldimethylamine, sodium isostearyl-2-lactate of mixtures thereof. Diblock and triblock polymeric surfactants are used in the present invention. Exemplary diblock and triblock polymeric surfactants include, but are not limited to diblock and triblock copolymers based on polyester derivatives of fatty acids and poly[ethyleneoxide] (e.g., Hypermer® B246SF, Uniqema), diblock and triblock copolymers based on poly[ethyleneoxide] and poly[propyleneoxide], diblock and triblock copolymers based on polyisobutylene succinic anhydride and poly [ethyleneoxide], mixtures of any of the foregoing and the like. Preferably the diblock and triblock copolymers are based on polyester derivatives of fatty acids and poly[ethyleneoxide]. When a triblock surfactant is used, it is preferable that the triblock contains two hydrophobic regions and one hydrophilic region i.e. hydrophobe-hydrophile-hydrophobe. Preferably, one or more surfactants are selected in order to obtain a HLB (Hydrophobic Lipophilic Balance) value ranging from about 2 to 8, preferably 3 to 7 and more preferably about 4 to 6.

The amount (based on weight percent) of diblock or triblock surfactant is dependent on the amount of monomer used. The ratio of diblock or triblock surfactant to monomer is at least about 3 to 100. The amount of diblock or triblock surfactant to monomer can be greater than 3 to 100 and preferably is at least about 4 to 100 and more preferably at least about 5 to 100, and more preferably at least about 5.5 to 100, and more preferably at least about 6 to 100 and even more preferably at least about 7 to 100. The diblock or triblock surfactant is the primary surfactant of the emulsification system. A secondary surfactant can be added for ease of handling and processing, to improve emulsion stability or alter the emulsion viscosity. Examples of secondary surfactants include, but are not limited to, sorbitan fatty acid esters, ethoxylated sorbitan fatty acid esters, polyethoxylated sorbitan fatty acid esters, the ethylene oxide and/or propylene oxide adducts of alkylphenols, the ethylene oxide and/or propylene oxide adducts of long chain alcohols or fatty acids, mixed ethylene oxide/propylene oxide block copolymers, alkanolamides, mixtures thereof and the like.

Polymerization of the inverse emulsion may be carried out in any manner known to those skilled in the art, for example see Allcock and Lampe, *Contemporary Polymer Chemistry*, (Englewood Cliffs, N.J., PRENTICE-HALL, 1981), chapters 3-5.

The present invention provides for a cellulosic fiber composition comprising cellulosic fiber and the copolymer of the present invention.

The present invention also provides for a method of making the cellulosic fiber composition comprising the step of adding the copolymer of the present invention to a cellulosic slurry or cellulosic pulp slurry.

The copolymers of the invention can be used in papermaking systems and processes. The copolymers are useful as drainage and retention aids as well as contaminant control aids. In commercial papermaking a slurry of cellulosic fibers or pulp is deposited on a moving papermaking wire or fabric. The slurry may contain other chemicals, such as sizing agents, starches, deposit control agents, mineral extenders, pigments, fillers, organic or inorganic coagulants, conventional flocculants, or other common additives to paper pulp. Water from the deposited slurry is removed to form a sheet. Ordinarily the sheets are then pressed and dried to form paper or paper board. The copolymers of the invention are added to the slurry before it reaches the wire to improve the drainage or dewatering and the retention of the fiber fines and fillers in the slurry.

As a contaminant control aid the copolymers of the present invention inhibit the deposition of pitch and stickies from the virgin or recycled pulp stock on the papermaking equipment. The copolymers of the present invention are added to the pulp slurry where they interfere with the agglomeration of the pitch and stickies that would otherwise detrimentally affect the paper, paper making equipment or paper making processes.

Suitable cellulosic fiber pulps for the method of the invention include conventional papermaking stock such as traditional chemical pulp. For instance, bleached and unbleached sulfate pulp and sulfite pulp, mechanical pulp such as groundwood, thermomechanical pulp, chemi-thermomechanical pulp, recycled pulp such as old corrugated containers, newsprint, office waste, magazine paper and other non-deinked waste, deinked waste, and mixtures thereof, may be used.

The copolymer of the invention may be provided to the end use application in a number of physical forms. In addition to the original emulsion form, the inventive copolymer may also be provided as an aqueous solution, dry solid powder, or dispersion form. The inventive copolymer is typically diluted at the application site to produce an aqueous solution of 0.1 to 1% active polymer.

This dilute solution of the inventive copolymer is then added to the paper process to affect retention and drainage. The inventive copolymer may be added to the thick stock or thin stock, preferably the thin stock. The copolymer may be added at one feed point, or may be split fed such that the copolymer is fed simultaneously to two or more separate feed points. Typical stock addition points include feed point(s) before the fan pump, after the fan pump and before the pressure screen, or after the pressure screen.

The inventive copolymer is preferably employed in a proportion of from about 0.01 lb. to about 10 lbs. of active polymer per ton of cellulosic pulp, based on the dry weight of the pulp. The concentration of copolymer is more preferably from about 0.05 lb. to about 5 lbs. of active polymer per ton of dried cellulosic pulp and even more preferably 0.1 to 1.5 lbs of active polymer per ton of dried cellulosic pulp.

The present invention will now be further described with reference to specific examples that are to be regarded solely as illustrative and not restricting the scope of the present invention.

EXAMPLES

Examples of Water Soluble Cationic and Amphoteric Copolymers and Comparative Copolymers Amphoteric Copolymers

Example 1

To a suitable reaction flask equipped with an overhead mechanical stirrer, thermometer, nitrogen sparge tube, and condenser was charged an oil phase of paraffin oil (139.72 g Exxsol® D80, Exxon, Houston, Tex.) and surfactants (4.66 g Atlas® G-946 and 9.32 g Hypermer® B246SF, Uniqema, New Castle, Del.). The temperature of the oil phase was then adjusted to 37° C.

An aqueous phase was prepared separately which comprised 53-wt. % acrylamide solution in water (115.76 g), acrylic acid (56.54 g), [2-(acryloyloxy)ethyl]trimethyl ammonium chloride (AETAC) (25.89 g) (80% by weight solution), deionized water (88.69 g), and Versenex® 80 (Dow Chemical, Midland, Mich.) chelant solution (0.6 g). The aqueous phase was then adjusted to pH 5.4 with the addition of sodium hydroxide solution in water (31.07 g, 50-wt. %). The temperature of the aqueous phase after neutralization was 39° C.

The aqueous phase was then charged to the oil phase while simultaneously mixing with a homogenizer to obtain a stable water-in-oil emulsion. This emulsion is then mixed with a 4-blade glass stirrer while being sparged with nitrogen for 60 minutes. During the nitrogen sparge the temperature of the emulsion was adjusted to 50±1° C. Afterwards, the sparge was discontinued and a nitrogen blanket implemented.

The polymerization was initiated by feeding a 3-wt. % AIBN (0.12 g) solution in toluene (3.75 g) over a period of 2-hours. This corresponds to an initial AIBN charge as AIBN of 250 ppm on a total monomer basis. During the course of the feed the batch temperature was allowed to exotherm to 62° C. (~50 minutes), after which the batch was maintained at 62±1° C. for 1-hour. Afterwards 3-wt. % AIBN (0.05 g) solution in toluene (1.50 g) was then charged in one shot. This corresponds to a second AIBN charge as AIBN of 100 ppm on a total monomer basis. Then the batch was held at 62±1° C. for 2-hour. Then batch was cooled to room temperature and the product collected.

Examples 2-5

Examples 2-5 were prepared as example 1 above with the following modifications: The amount of AETAC was increased from 5% (moles of monomer) to 10, 15, 20, and 25% respectively, and the amount of acrylic acid was decreased from 45% (moles of monomer) to 40, 35, 30, and 25%, respectively). The acrylamide amount remained constant at 50 mole percent. Water was adjusted to account for dilution in AETAC and acrylamide monomers

Examples 6-10

Examples 6-10 were prepared as example 1 with the following exceptions: The cationic monomer used was acryloyloxyethyldimethylbenzylammoniumchloride (AEDBAC) (ADAMQUAT® BZ 80, Elf Atochem, Philadelphia, Pa.) (80% by weight solution) instead of AETAC. The level of cationic monomer was 5, 10, 15, 20, and 25% on a molar basis for examples 6, 7, 8, 9, and 10 respectively and the amount of acrylic acid was decreased from 45% (moles of monomer) to 40, 35, 30, and 25%, respectively). The acrylamide amount remained constant at 50 mole percent. Water was adjusted to account for dilution in AEDBAC and acrylamide monomers.

Cationic Copolymers

Example 11

To a suitable reaction flask equipped with an overhead mechanical stirrer, thermometer, nitrogen sparge tube, and condenser was charged an oil phase of paraffin oil (139.7 g, Escaid® 110 oil, Exxon, Houston, Tex.) and surfactants (4.66 g Atlas® G-946 and 9.32 g Hypermer® B246SF). The temperature of the oil phase was then adjusted to 45° C.

An aqueous phase was prepared separately which comprised 53-wt. % acrylamide solution in water (252.3 g), acryloyloxyethyltrimethylammoniumchloride (AETAC) (80% by weight solution) (23.52 g), deionized water (56.1 g), and Versenex® 80 (Dow Chemical) chelant solution (1.39 g). The solution was mixed and warmed to approximately 30° C.

The aqueous phase was then charged to the oil phase while simultaneously mixing with a homogenizer to obtain a stable water-in-oil emulsion. This emulsion is then mixed with a 4-blade glass stirrer while being sparged with nitrogen for 60 minutes. During the nitrogen sparge the temperature of the emulsion was adjusted to approximately 63° C. Afterwards, the sparge was discontinued and a nitrogen blanket implemented.

The polymerization was initiated by adding 50 ppm (based on moles of total monomer) as a 3-wt. % AIBN dispersion in Escaid 110 oil (0.016 g AIBN). During the course of the polymerization, the batch temperature was maintained at approximately 63° C. After the exotherm began to diminish, a second 50 ppm shot of AIBN was added. When the exotherm diminishes again, the reactor and contents were warmed to 65° C. and 200 ppm of AIBN was added. The reaction was held at 65° C. until reaching desired residual monomer levels. The batch was then cooled and additional inverting surfactant was added. The product was further cooled to room temperature and collected.

Examples 12-14

Examples 12-14 were prepared as example 11 above with the following modifications: The amount of AETAC was increased from 5% (moles of monomer) to 10, 15, and 25% respectively. The acrylamide amount was decreased corresponding to percent of AETAC in each example. Water was adjusted to account for dilution in AETAC and acrylamide monomers.

Examples 15-17

Examples 15-17 were prepared as example 11 with the following exceptions: The cationic monomer used was acryloxyethyldimethylbenzylammoniumchloride (ADAMQUAT® BZ 80, Elf Atochem, Philadelphia, Pa.) (80% by weight solution) instead of AETAC. The level of cationic monomer was 5, 10, and 15% on a molar basis for examples 15, 16, and 17 respectively. The levels of acrylamide and water were adjusted accordingly for each example.

Retention Data of Water Soluble Cationic and Amphoteric Copolymers and Comparative Copolymers Retention data is provided in Tables 1 through 10. Tables 1 through 8 provide retention data for the amphoteric samples. Tables 9 and 10 provides retention data for cationic samples. These evaluations were performed in a laboratory-generated alkaline furnish or acid ground wood furnish.

The alkaline furnish is prepared from hardwood and softwood dried market lap pulps, water and further materials. First the hardwood and softwood dried market lap pulp are separately refined in a laboratory Valley Beater (Voith, Appleton, Wis.). These pulps are then added to an aqueous medium comprising a mixture of local hard water and deionized water to a representative hardness. Inorganic salts are added in amounts so as to provide this medium with a representative alkalinity and a total solution conductivity. The hardwood and softwood are dispersed into the aqueous medium at typical weight ratios. Precipitated calcium carbonate (PCC) is introduced into the furnish at 25 weight percent, based on the combined dry weight of the pulps, so as to provide a final furnish comprising 80% fiber and 20% PCC filler.

The acid groundwood furnish is prepared from softwood dried market lap pulps, thermo-mechanical pulp (TMP), water and further materials. First the softwood dried market lap pulp and TMP are separately refined in a laboratory Valley Beater (Voith, Appleton, Wis.). These pulps are then added to an aqueous medium comprising a mixture of local hard water and deionized water to a representative hardness. Inorganic salts are added in amounts so as to provide this medium with a representative alkalinity and a total solution conductivity. Pectin gum is a water soluble polygalacturonan added at a representative amount to provide a soluble organic material to the furnish. The softwood and TMP are dispersed into the aqueous medium at typical weight ratios. Calcined clay is introduced into the furnish at 30 weight percent, based on the combined dry weight of the pulps, so as to provide a final furnish comprising 77% fiber and 23% clay filler. The stock pH of the acid ground wood furnish was adjusted to about 4.5 to about 4.8 prior to testing.

The emulsions must be inverted to form an aqueous solution prior to testing. Prior to inverting the water-soluble cationic and amphoteric copolymer emulsions for analysis, approximately 2 wt. % of a breaker surfactant, for example a 80:20 by weight mixture of Tergitol® 15-S-9 (Dow Chemical. Midland, Mich.) and Aerosol® OT-S (Cytec Industries, West Patterson, N.J.), was added. The pH of the inverted water-soluble cationic and amphoteric copolymers were then adjusted to a minimum of 6.0 with aqueous sodium hydroxide or ammonium hydroxide, as required.

To evaluate the performance of the water-soluble cationic and amphoteric copolymers of the present invention, a series of Britt jar retention tests were conducted compared to Polyflex CP.3 (Ciba Specialty Chemicals, Tarrytown, N.Y.), an organic drainage aid commonly referred to within the industry as a "micropolymer".; EM 635 (Chemtall, Riceboro, Ga.) is a 50/50 mole % sodium acrylate/acrylamide linear flocculent emulsion; BMA 780 is silica sol (Eka Chemicals, Marietta, Ga.); SP 9232 is PerForm® SP9232 (Hercules Incorporated, Wilmington, Del.), a structured organic particulate. The cationic flocculants utilized in the benchmark cationic polyacrylamide treatment program (referred to as CPAM) are 90/10 mole % acrylamide/AETAC copolymers (Perform® PC 8138 and Perform® PC 8715, Hercules Incorporated, Wilmington Del.). PC 8138 (Perform® PC 8138) is provided as an emulsion. PC 8715 (Perform® PC 8715) is provided as a powder. cal Corporation, Baltimore, Md.). Unless otherwise stated, all percentages, parts, lb./ton, etc., are by active weight.

The data set forth in Tables 1 through 10 illustrate the retention activity of the water-soluble cationic and amphoteric copolymers of the invention compared to the materials listed above.

The Britt Fines retention (FPFR) testing was performed according to TAPPI Method T261 with the following modifications and specifications: A 125P screen was utilized. A vaned Britt jar was used for all testing. Mixing speed was 1600 rpm for the acid ground wood furnish and was 1200 rpm for the alkaline furnish. The addition sequence is noted in the tables.

TABLE 1

Evaluation of Amphoteric Copolymer Samples
FURNISH: Acid Ground Wood
Additive # 1 10#/T Stalok
Additive # 2 5 #/T Alum

| Additive # 3 | #/T (active) | Mix time secs | Additive # 4 | #/T (active) | Avg. Britt Fines Retention |
|---|---|---|---|---|---|
| none | | 10 | | | 19.3 |
| PC 8138 | 0.5 | 10 | | | 36.1 |
| PC 8715 | 0.5 | 10 | | | 38.3 |
| SP9232 | 0.5 | 10 | | | 25.8 |
| EM 635 | 0.5 | 10 | | | 24.8 |
| Example 6 | 0.5 | 10 | | | 20.2 |
| Example 7 | 0.5 | 10 | | | 19.7 |
| Example 8 | 0.5 | 10 | | | 18.1 |
| Example 9 | 0.5 | 10 | | | 19.2 |
| Example 10 | 0.5 | 10 | | | 21.1 |

TABLE 2

Evaluation of Amphoteric Copolymer Samples
FURNISH: Acid Ground Wood
Additive # 1 10#/T Stalok
Additive # 2 5 #/T Alum

| Additive # 3 | #/T (active) | Mix time secs | Additive # 4 | #/T (active) | Avg. Britt Fines Retention |
|---|---|---|---|---|---|
| PC 8715 | 0.5 | 10 | none | | 38.3 |
| PC 8715 | 0.5 | 10 | BMA 780 | 2 | 40.9 |
| PC 8715 | 0.5 | 10 | SP9232 | 0.5 | 40.6 |
| PC 8715 | 0.5 | 10 | EM 635 | 0.5 | 39.9 |
| PC 8715 | 0.5 | 10 | Example 6 | 0.5 | 30.6 |
| PC 8715 | 0.5 | 10 | Example 7 | 0.5 | 29.0 |
| PC 8715 | 0.5 | 10 | Example 8 | 0.5 | 27.7 |

TABLE 2-continued

Evaluation of Amphoteric Copolymer Samples
FURNISH: Acid Ground Wood
Additive # 1 10#/T Stalok
Additive # 2 5 #/T Alum

| Additive # 3 | #/T (active) | Mix time secs | Additive # 4 | #/T (active) | Avg. Britt Fines Retention |
|---|---|---|---|---|---|
| PC 8715 | 0.5 | 10 | Example 9 | 0.5 | 28.3 |
| PC 8715 | 0.5 | 10 | Example 10 | 0.5 | 28.3 |

TABLE 3

Evaluation of Amphoteric Copolymer Samples
FURNISH: Acid Ground Wood
Additive # 1 10#/T Stalok
Additive # 2 1 #/T PC 1279

| RUN # | Additive # 3 | #/T (active) | Mix time secs | Additive # 4 | #/T (active) | Avg. Britt Fines Retention |
|---|---|---|---|---|---|---|
| | none | | 10 | | | 19.3 |
| 1 | PC 8715 | 0.5 | 10 | | | 38.5 |
| 8 | EM 635 | 0.5 | 10 | | | 25.4 |
| 9 | Example 3 | 0.5 | 10 | | | 25.1 |
| 10 | Example 4 | 0.5 | 10 | | | 24.6 |
| 11 | Example 5 | 0.5 | 10 | | | 24.8 |
| 12 | Example 2 | 0.5 | 10 | | | 25.4 |
| 13 | Example 1 | 0.5 | 10 | | | 25.5 |

TABLE 4

Evaluation of Amphoteric Copolymer Samples
FURNISH: Acid Ground Wood
Additive # 1 10#/T Stalok
Additive # 2 1 #/T PC 1279

| Additive # 3 | #/T (active) | Mix time secs | Additive # 4 | #/T (active) | Avg. Britt Fines Retention |
|---|---|---|---|---|---|
| PC 8715 | 0.5 | 10 | none | — | 38.5 |
| PC 8715 | 0.5 | 10 | EM 635 | 0.5 | 40.8 |
| PC 8715 | 0.5 | 10 | Example 3 | 0.5 | 30.3 |
| PC 8715 | 0.5 | 10 | Example 4 | 0.5 | 30.6 |
| PC 8715 | 0.5 | 10 | Example 5 | 0.5 | 30.2 |
| PC 8715 | 0.5 | 10 | Example 2 | 0.5 | 30.7 |
| PC 8715 | 0.5 | 10 | Example 1 | 0.5 | 31.4 |

TABLE 5

Evaluation of Amphoteric Copolymer Samples
FURNISH: Alkaline
Additive # 1 10#/T Stalok
Additive # 2 5 #/T alum

| Additive # 3 | #/T (active) | Mix time secs | Additive # 4 | #/T (active) | Avg. Britt Fines Retention |
|---|---|---|---|---|---|
| none | | | | | 35.0 |
| PC 8138 | 0.4 | 10 | | | 57.3 |
| Polyflex CP.3 | 0.4 | 10 | | | 68.3 |
| SP9232 | 0.4 | 10 | | | 72.1 |
| EM 635 | 0.4 | 10 | | | 65.5 |
| Example 6 | 0.4 | 10 | | | 52.7 |
| Example 7 | 0.4 | 10 | | | 46.3 |
| Example 8 | 0.4 | 10 | | | 42.0 |
| Example 9 | 0.4 | 10 | | | 40.7 |
| Example 10 | 0.4 | 10 | | | 32.6 |

TABLE 6

Evaluation of Amphoteric Copolymer Samples
FURNISH: Alkaline
Additive # 1 10#/T Stalok
Additive # 2 5 #/T alum

| Additive # 3 | #/T (active) | Mix time secs | Additive # 4 | #/T (active) | Avg. Britt Fines Retention |
|---|---|---|---|---|---|
| PC 8138 | 0.4 | 10 | none | | 57.3 |
| PC 8138 | 0.4 | 60 | Polyflex CP.3 | 0.4 | 77.8 |
| PC 8138 | 0.4 | 60 | SP 9232 | 0.4 | 77.1 |
| PC 8138 | 0.4 | 60 | EM 635 | 0.4 | 69.0 |
| PC 8138 | 0.4 | 60 | Example 6 | 0.4 | 59.8 |
| PC 8138 | 0.4 | 60 | Example 7 | 0.4 | 53.5 |
| PC 8138 | 0.4 | 60 | Example 8 | 0.4 | 48.2 |
| PC 8138 | 0.4 | 60 | Example 9 | 0.4 | 45.2 |
| PC 8138 | 0.4 | 60 | Example 10 | 0.4 | 34.9 |

TABLE 7

Evaluation of Amphoteric Copolymer Samples
FURNISH: Alkaline
Additive # 1 10#/T Stalok
Additive # 2 5 #/T alum

| Additive # 3 | #/T (active) | Mix time secs | Additive # 4 | #/T (active) | Avg. Britt Fines Retention |
|---|---|---|---|---|---|
| none | | | | | 35.0 |
| PC 8138 | 0.4 | 10 | | | 54.7 |
| EM 635 | 0.4 | 10 | | | 65.0 |
| Example 3 | 0.4 | 10 | | | 41.4 |
| Example 4 | 0.4 | 10 | | | 37.9 |
| Example 5 | 0.4 | 10 | | | 38.9 |
| Example 2 | 0.4 | 10 | | | 44.7 |
| Example 1 | 0.4 | 10 | | | 55.7 |

TABLE 8

Evaluation of Amphoteric Copolymer Samples
FURNISH: Alkaline
Additive # 1 10#/T Stalok
Additive # 2 5 #/T alum

| Additive # 3 | #/T (active) | Mix time secs | Additive # 4 | #/T (active) | Avg. Britt Fines Retention |
|---|---|---|---|---|---|
| PC 8138 | 0.4 | 10 | none | — | 54.7 |
| PC 8138 | 0.4 | 60 | EM 635 | 0.4 | 67.3 |
| PC 8138 | 0.4 | 60 | Example 3 | 0.4 | 45.2 |
| PC 8138 | 0.4 | 60 | Example 4 | 0.4 | 39.8 |
| PC 8138 | 0.4 | 60 | Example 5 | 0.4 | 40.3 |
| PC 8138 | 0.4 | 60 | Example 2 | 0.4 | 48.5 |
| PC 8138 | 0.4 | 60 | Example 1 | 0.4 | 59.5 |

TABLE 9

Evaluation of Cationic Copolymer Samples
FURNISH: Alkaline
Additive # 1: 10#/T Stalok
Additive # 2: 5 #/T Alum

| Additive # 3 | #/T (active) | Mix time secs | Avg. Britt Fines Retention |
|---|---|---|---|
| none | | | 35.2 |
| PC 8138 | 0.4 | 10 | 57.3 |
| Example 11 | 0.4 | 10 | 36.9 |

TABLE 9-continued

Evaluation of Cationic Copolymer Samples
FURNISH: Alkaline
Additive # 1: 10#/T Stalok
Additive # 2: 5 #/T Alum

| Additive # 3 | #/T (active) | Mix time secs | Avg. Britt Fines Retention |
|---|---|---|---|
| Example 12 | 0.4 | 10 | 44.0 |
| Example 13 | 0.4 | 10 | 45.9 |
| Example 14 | 0.4 | 10 | 55.0 |
| Example 15 | 0.4 | 10 | 36.6 |
| Example 16 | 0.4 | 10 | 44.1 |
| Example 17 | 0.4 | 10 | 47.1 |

TABLE 10

Evaluation of Cationic Copolymer Samples
FURNISH: Acid Ground Wood
Additive # 1: 10#/T Stalok
Additive # 2: 5 #/T Alum

| Additive # 3 | #/T (active) | Mix time secs | Avg. Britt Fines Retention |
|---|---|---|---|
| none | — | | 19.3 |
| PC 8138 | 0.5 | 10 | 36.1 |
| PC 8715 | 0.5 | 10 | 38.3 |
| Example 11 | 0.5 | 10 | 23.2 |
| Example 12 | 0.5 | 10 | 26.6 |
| Example 13 | 0.5 | 10 | 28.5 |
| Example 14 | 0.5 | 10 | 21.6 |
| Example 15 | 0.5 | 10 | 25.2 |
| Example 16 | 0.5 | 10 | 29.6 |
| Example 17 | 0.5 | 10 | 31.5 |

The alum is aluminum sulfate-octadecahydrate available as a 50% solution (Delta Chemical Corporation, Baltimore, Md.).

PC 1279 is Perform® PC 1279 (Hercules Incorporated), a cationic polyamine coagulant.

Stalok is Stalok® 400 (A. E. Staley, Cedar Rapids, Iowa), a modified potato starch.

Rheological Properties of Water Soluble Cationic and Amphoteric Copolymers and Comparative Copolymers The emulsions must be inverted to form an aqueous solution prior to testing. Prior to inverting the water-soluble cationic and amphoteric copolymer emulsions for analysis, approximately 2 wt. % of a breaker surfactant, for example a 80:20 by weight mixture of Tergitol® 15-S-9 (Dow Chemical. Midland, Mich.) and Aerosol® OT-S (Cytec Industries, West Patterson, N.J.), was added. The pH of the inverted water-soluble cationic and amphoteric copolymers were then adjusted to a minimum of 6.0 with aqueous sodium hydroxide or ammonium hydroxide, as required.

A discussion of these rheological techniques is provided by Macosko, *Rheology: Principles, Measurements, and Applications* (New York, Wiley, 1994); L. H. Sperling, *Introduction to Polymer Science* (New York, Wiley-Interscience, 1992); and J. Ferry, *Viscoelastic Properties of Polymers*, $3^{rd}$ edition, (New York, J. Wiley & Sons, 1980). The viscoelastic behavior as discussed herein is a time dependent response to an applied force, where at short times or high frequency the material will exhibit hard or glassy properties, and at long times or low frequency a material can flow and exhibit viscous properties. Viscoelastic properties were determined with polymer solutions at 1.5% (w/w) in deionized water, utilizing a Haake RS-75 controlled stress rheometer. A frequency sweep was conducted with the rheometer in dynamic oscillation mode, at a constant stress determined to be within the linear viscoelastic region, and a frequency range of 0.01 Hz to 10 Hz. The output from this test will define both an elastic component of the material, or the energy stored per oscillatory cycle, and a viscous component, or the energy lost per cycle. The storage modulus (G') is defined as:

$$G'(Pa) = (\tau_0/\gamma_0)\cos\delta$$

and the loss modulus (G") is defined as:

$$G''(Pa) = (\tau_0/\gamma_0)\sin\delta$$

where $\tau_0$ is the stress amplitude, $\gamma_0$ is the strain amplitude, and $\delta$ is the phase angle shift between the stress and resultant strain.

In the terminal (low frequency) regime, the loss modulus is greater than the storage modulus for linear polymers, as the long times allow the polymer chains to disentangle and exhibit predominantly viscous behavior. As the frequency increases, a rubbery plateau regime occurs where the time required for the polymer chains to disentangle is greater than the time of the test. In this region, the storage modulus is greater than the loss modulus, and the material will appear to be a network comprised of permanent entanglements. The storage modulus is independent of the test frequency in this regime. The modulus is a function of network junction concentration as defined by the theory of rubber elasticity:

$$G_N = nRT$$

where $G_N$ is the plateau modulus, n is the concentration of network junctions, R is the gas constant, and T is temperature.

The plateau modulus $G_N$ can be considered to be similar in magnitude to the storage modulus G' in the plateau regime. As the concentration of network junctions increases, the modulus will increase. These network junctions can be affected by either chemical or physical cross-links.

The dilute solution properties provide a relative indication of polymer hydrodynamic volume (HDV) and molecular weight. In this experiment, the solvent viscosity ($\eta_0$) is compared to the polymer solution viscosity ($\eta$). The specific viscosity ($\eta_{sp}$) is the unitless ratio as described by the following equation:

$$\eta_{sp} = (\eta/\eta_0) - 1$$

The reduced specific viscosity (RSV) is the specific viscosity divided by the concentration. The intrinsic viscosity [$\eta$], or IV, is the specific viscosity divided by the polymer concentration (c) as the concentration is extrapolated to zero concentration:

$$[\eta] = [\eta_{sp}/c]_{c \to 0}$$

The units for IV are deciliter per gram (dL/g) and describe the hydrodynamic volume of a polymer in solution. Thus a higher IV indicates a large hydrodynamic volume in solution, and a higher MW when comparing conventional polymers of similar composition in a similar solvent. The specific viscosities were determined in 0.01 M NaCl with dilution concentrations from 0.0025% to 0.025% utilizing a Ubbelohde model "OC" Viscometer at 30° C.

The unitless Huggins' constant (k') is determined from the slope of the specific viscosity data according to:

$$\eta_{sp}/c = [\eta] + k'[\eta]^2 c$$

where the value of c is between 0.0025 and wt % and 0.025 wt %.

As reviewed by Mark et al., editors, *Encyclopedia of Polymer Science and Engineering* (New York, J. Wiley & Sons, 1988), Vol. 1, pp. 26-27, typical k' values for linear polymers are on the order of approximately 0.25-0.50. An increase in the k' value is indicative of an increase in "structure" of the polymer, and can be attributed to a number of factors including molecular association. The k' values in Tables 11 and 12 for the linear APAM are all 0.3 to 0.4, while the values of greater than 0.0.5 are obtained for the preferred water-soluble copolymers of the present invention, further supporting the presence of a non-linear species.

TABLE 11

Evaluation of Amphoteric Copolymers
Dynamic Mechanical Studies
1.5% Active Polymer

| Polymer | G', Pa, 6.3 Hz | k' |
|---|---|---|
| EM 635 | 130 | 0.30 |
| Example 1 | 462 | 1.49 |
| Example 2 | 289 | 3.10 |
| Example 3 | 138 | 4.01 |
| Example 4 | | 6.46 |
| Example 5 | | 1.72 |
| Example 6 | 364 | 9.7 |
| Example 7 | 305 | 9.7 |
| Example 8 | 143 | — |
| Example 9 | 19 | — |

TABLE 12

Evaluation of Cationic Copolymers
Dynamic Mechanical Studies
3.0% Active Polymer

| Polymer | G', Pa, 6.3 Hz | k' |
|---|---|---|
| PC 8138 | 104 | |
| PC 8715 | 108 | 0.24 |
| Example 11 | 356 | |
| Example 12 | 336 | 1.10 |
| Example 13 | 268 | |
| Example 14 | 178 | 1.03 |
| Example 15 | 268 | |
| Example 16 | 162 | 0.58 |
| Example 17 | 133 | 0.69 |

It is noted that the foregoing examples have been provided merely for the purpose of explanation and are in no way to be construed as limiting of the present invention. While the present invention has been described with reference to an exemplary embodiment, it is understood that the words that have been used herein are words of description and illustration, rather than words of limitation. Although the present invention has been described herein with reference to particular means, materials and embodiments, the present invention is not intended to be limited to the particulars disclosed herein. The water-soluble cationic and amphoteric copolymers of the present invention may also exhibit unique activity in other applications such as coagulants and/or flocculants in wastewater treatment applications, or as rheology modifiers in drilling and/or cement processing applications.

The invention claimed is:

1. A copolymer composition comprising:
   at least one associative inverse emulsion copolymer, wherein said at least one associative inverse emulsion copolymer has associative properties provided by at least one emulsification surfactant that is solely a triblock polymeric surfactant in which the surfactant to monomer ratio is at least 3:100 wherein said at least one associative inverse emulsion copolymer consists only of:

at least one nonionic polymer segment B consisting only of one or more ethylenically unsaturated nonionic monomers, and at least one cationic polymer segment C consisting only of one or more ethylenically unsaturated cationic monomers;

the molar % ratio of B:C is from 99:1 to 1:99; and wherein said at least one associative inverse emulsion copolymer has a Huggins' constant (k') determined in 0.01 M NaCl greater than 0.5; and said at least one associative inverse emulsion copolymer has a storage modulus (G') in a 3.0 wt % actives polymer solution at 6.3 Hz greater than 50 Pa.

2. The composition of claim 1 wherein B is selected from the group consisting of acrylamide, methacrylamide; N-alkylacrylamides, N,N-dialkyl-acrylamide; methyl methacrylate, methyl acrylate; acrylonitrile; N-vinyl methylacetamide; N-vinylformamide; N-vinylmethyl formamide; vinyl acetate; N-vinyl pyrrolidone; and mixtures of any of the foregoing.

3. The composition of claim 1 wherein C is selected from the group consisting of diallyldialkylammonium halides, (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth)acrylamides, such as N,N-dimethylaminoethylacrylamide, and the salt and quaternaries thereof and mixtures of any of the foregoing.

4. The composition of claim 1 wherein the triblock surfactant is a copolymer based on polyester derivatives of fatty acids and poly(ethyleneoxide).

5. The composition of claim 1 further comprising cellulose fiber.

6. A method of making a cellulose fiber composition which comprises adding to a cellulose pulp slurry the water-soluble cationic copolymer of claim 1.

7. The composition of claim 1 wherein the emulsification surfactant consists of a blend of a polymeric surfactant comprising one or two polymeric components derived from oil-soluble complex monocarboxylic acid and a water-soluble component derived from polyalkylene glycol, and sorbitan monooleate; and 2,2'-azobisisobutyronitrile is employed as the free radical initiator.

8. The composition of claim 7 wherein the surfactant system has a combined Hydrophilic-Lipophilic Balance of less than 8.

9. The composition of claim 8 wherein the triblock surfactant is a copolymer based on polyester derivatives of fatty acids and poly(ethyleneoxide).

10. The composition of claim 1 wherein the ratio of B:C is about 99:1 to about 50:50.

11. The composition of claim 10 wherein the ratio of B:C is about 95:5 to about 50:50.

12. The composition of claim 1 wherein k' is greater than 0.6.

13. The composition of claim 1 wherein G' is greater than 75.

14. A copolymer composition comprising:

at least one structured inverse emulsion copolymer, wherein said at least one structured inverse emulsion copolymer has associative properties provided by at least one emulsification surfactant that is a triblock polymeric surfactant in which the surfactant to monomer ratio is at least 3:100 wherein said at least one structured inverse emulsion copolymer consists only of:

at least one nonionic polymer segment B consisting only of one or more ethylenically unsaturated nonionic monomers, and at least one cationic polymer segment C consisting only of one or more ethylenically unsaturated cationic monomers;

the molar % ratio of B:C is from 99:1 to 1:99; and wherein said at least one structured inverse emulsion copolymer has a Huggins' constant (k') determined in 0.01 M NaCl greater than 0.5; and said at least one structured inverse emulsion copolymer has a storage modulus (G') in a 3.0 wt % actives polymer solution at 6.3 Hz greater than 50 Pa.

* * * * *